United States Patent
Wang et al.

(10) Patent No.: US 8,285,470 B2
(45) Date of Patent: Oct. 9, 2012

(54) ENGINE TRANSIENT MITIGATION FOR HYBRID VEHICLES

(75) Inventors: Qing Wang, Canton, MI (US); Fazal Urrahman Syed, Canton, MI (US); Brandon R. Masterson, Dexter, MI (US); Xiaoyong Wang, Canton, MI (US); Ming Lang Kuang, Canton, MI (US); Ryan Abraham McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 12/915,456

(22) Filed: Oct. 29, 2010

(65) Prior Publication Data

US 2011/0166730 A1    Jul. 7, 2011

(51) Int. Cl.
*B60W 20/00* (2006.01)

(52) U.S. Cl. ........ 701/103; 701/99; 180/65.28; 903/905

(58) Field of Classification Search .............. 701/22, 701/99–104, 110; 180/65.1–65.28; 903/902, 903/903, 905; 340/439; 123/436, 675, 704
See application file for complete search history.

(56) References Cited

U.S. PATENT DOCUMENTS

| 5,862,497 A | 1/1999 | Yano et al. |
| 6,164,400 A * | 12/2000 | Jankovic et al. ........... 180/65.25 |
| 7,237,634 B2 | 7/2007 | Severinsky et al. |
| 7,559,388 B2 * | 7/2009 | Severinsky et al. ........ 180/65.28 |
| 7,640,914 B2 | 1/2010 | Lewis et al. |
| 2004/0104058 A1 * | 6/2004 | Peters et al. ................. 180/65.2 |
| 2005/0003926 A1 | 1/2005 | Hanada et al. |
| 2011/0276207 A1 * | 11/2011 | Falkenstein ..................... 701/22 |

FOREIGN PATENT DOCUMENTS

JP    10246132 A    9/1998

* cited by examiner

*Primary Examiner* — Khoi Tran
*Assistant Examiner* — Spencer Patton
(74) *Attorney, Agent, or Firm* — Brooks Kushman P.C.; David B. Kelley

(57) ABSTRACT

A method and system for limiting a fast transient in an engine in a hybrid vehicle is provided. The predicted fuel loss percentage is calculated from an inferred air-fuel ratio (inferred lambda). The rate limit term is calculated from a measured air-fuel ratio (measured lambda) and an engine torque command change rate. The predicted fuel loss percentage and the rate limit term are inputs into a calibration table to determine an engine power rate limit and an engine torque rate limit. An engine torque command is limited using the engine torque rate limit to control a fast engine torque transient for an engine. An engine power command is limited using the engine power rate limit to control the fast engine power transient for the engine.

11 Claims, 4 Drawing Sheets

ENGINE TRANSIENT MITIGATION FOR HYBRID VEHICLES

BACKGROUND

1. Technical Field

Various embodiments relate to methods and systems for controlling a hybrid vehicle.

2. Background Art

Hybrid-Electric Vehicles (HEVs), in general, employ a combination of an internal combustion engine and an electric machine operable as one of a motor and a generator based on the desired operating state. The engine and the electric machine may be arranged in series, parallel, and/or split configurations. For example, a conventional parallel hybrid powertrain in an HEV has both an engine and an electric machine operable as a drive motor or generator. The engine is mechanically coupled to the driving wheels, such that torque from the engine, the electric machine motoring, or a combination of the two propels the vehicle. When vehicle power demands are low, the engine may turn the electric machine as a generator to recharge the battery pack, as well as provide the necessary torque to propel the vehicle. Regenerative braking is commonly used for recharging a battery pack.

In a hybrid vehicle, a fast engine transient caused by the fast engine response typically adversely affects the fuel combustion efficiency. The fast engine transient could be a torque transient, power transient, speed transient, or the like. The engine operates under non-optimum settings that require additional fuel compared to that used during operation under stoichiometric conditions, for producing the same torque. The decreased fuel efficiency caused by the use of additional fuel is mainly due to fuel enrichment of the mixture being injected into the engine. For example, an engine in an HEV during an engine transient may produce an increase of one percent of torque using an additional ten percent of fuel with respect to stoichiometric operation.

Engine fuel injection is mainly determined based on the measured air mass combined with compensation using transient fuel amounts. On the other hand, control parameters are often 'predicatively' scheduled based on the rate of change of engine torque command. Many of them are designed with intentional delays with finite response time. Therefore fast engine torque command directly introduces disturbance to the air/fuel (A/F) ratio and results in other non-optimum engine settings. In the case of large A/F errors, i.e., a sufficiently high degree of enrichment, it may lead to considerable fuel losses.

SUMMARY

In an embodiment of the invention, a method for limiting a fast transient in an engine in a hybrid vehicle includes calculating a predicted fuel loss percentage from an inferred air-fuel ratio (inferred lambda), calculating a rate limit term from a measured air-fuel ratio (measured lambda) and an engine torque command change rate, and inputting the predicted fuel loss percentage and the rate limit term into a calibration table to determine an engine power rate limit and an engine torque rate limit. The method also includes limiting an engine torque command using the engine torque rate limit to control a fast engine transient for an engine, and limiting an engine power command using the engine power rate limit to control the fast engine transient for the engine.

In another embodiment, a method for controlling a hybrid vehicle using an electronic control unit (ECU) is provided. The method provides an inferred air-fuel ratio, a measured air-fuel ratio, and an engine torque command to the ECU to determine a rate limited engine power command and a rate limited engine torque command. The method provides the rate limited engine power command and the rate limited engine torque command to the engine to minimize fuel-rich operation when driver demand on the engine is below a sum of an engine power command and a maximum available battery power.

In yet another embodiment, a powertrain system for a hybrid vehicle with an internal combustion engine and an electric machine for propelling the vehicle, and a battery for providing electric power to the electric machine is provided. The system has an electronic control unit (ECU) in communication with and controlling the operation of the engine and the electric machine. The ECU includes a calibration table to determine an engine power rate limit and an engine torque rate limit, with a fuel loss percentage and a rate limit as inputs to the calibration table. The engine power rate limit and engine torque rate limit minimize fuel rich operation of the engine and improve engine fuel efficiency. The ECU adjusts the engine torque rate limit if a driver demand on the engine exceeds a sum of an engine power command and a maximum available electrical power from the battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
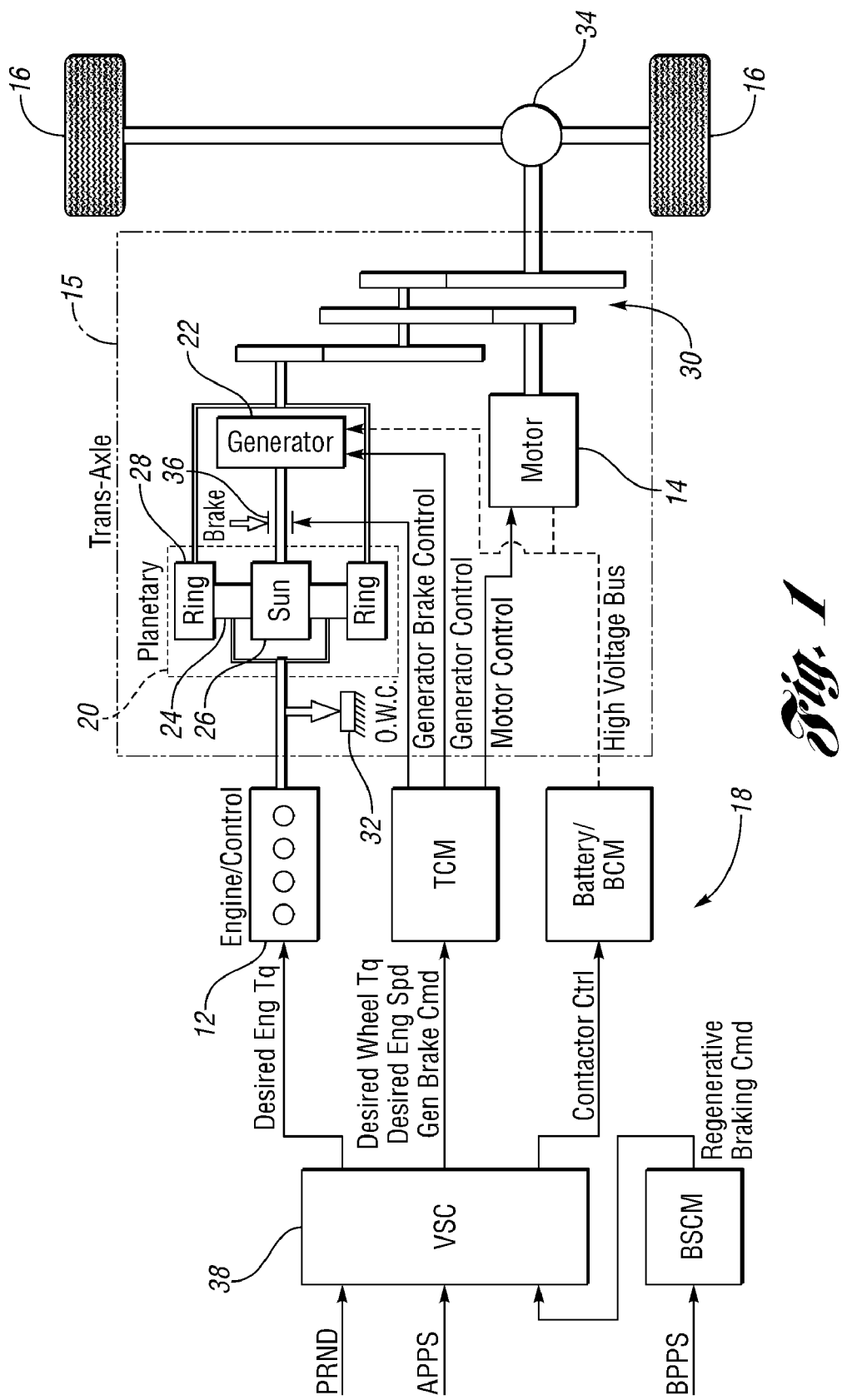
FIG. 1 is a schematic view of a hybrid vehicle according to an embodiment.

FIG. 1 illustrates a hybrid vehicle powertrain 10. The powertrain 10 may have any suitable configuration, such as a series drive, split hybrid drive, or dual mode split as is known in the art. In the embodiment shown in FIG. 1, a power split drive configuration is shown having a first power source 12 and a second power source 14, such as, respectively, an engine 12 and an electric machine 14 with a battery 18. Other power sources are also contemplated. The engine 12 may use gasoline, diesel, ethanol, or other combustible fuels as are known in the art.

The engine 12 and the electric machine 14 are arranged in parallel and connected to the driving wheelset 16 of a vehicle using a power transfer system 15. Of course, in other embodiments, either the engine 12 or the electric machine 14 may be configured to drive the wheelset 16, while the other drives a second wheelset (not shown).

The power transfer system 15 may include various mechanical, electrical, and/or electromechanical devices. In the embodiment shown in FIG. 1, the power transfer system 15 includes a planetary gear unit 20, a first electrical machine 14, power transfer gearing 30, and a second electrical machine 22 as primary components. The planetary gear unit 20 may have any suitable configuration. In the embodiment shown, the planetary gear unit 20 includes a sun gear 26, a plurality of planet gears 24, and a ring gear 28.

The planetary gear unit 20 transfers power between the engine 12, the electric machine 14, a second electric machine 22, and the wheelset 16. In the embodiment shown, the planetary gear unit 20 has a carrier for planet gears 24 connected to the engine 12, the second electric machine 22 connected to the sun gear 26, and the output of the planetary unit connected to the ring gear 28.

The engine 14 may be coupled to the planetary gear unit 20, permitting the engine 14 to drive the planetary gear unit 20. If a clutch 32 is engaged, the engine 14 may rotate the carrier for the planet gears 24 of the planetary gear unit 20, which in turn may rotate the ring gear 28. The ring gear 28 is coupled to the power transfer gearing 30 which is coupled to the wheelset 16. The power transfer gearing 30 includes a plurality of gear ratios that are engaged to provide a desired vehicle response.

In at least one embodiment, the power transfer system 30 may be connected to a differential 34 in any suitable manner, such as with a driveshaft, chain, or other mechanical linkage. The differential 34 is connected to each wheel of the wheelset 16 as is known in the art.

As shown in FIG. 1, the first electric machine 14 is powered by the battery 18 and is coupled to the power transfer gearing 30 to propel the wheelset 16 of the hybrid vehicle.

The second electric machine 22, which may be a motor-generator, is coupled to the sun gear 26 to provide reaction torque for the engine 12. A brake 36 provides reaction torque for the engine 12 during parallel drive when mechanical power is delivered to traction wheels 16. Overrunning coupling 32 provides reaction torque for the electric machine 22 during generation drive.

A control area network 38 has multiple control modules for controlling the system 15 including the engine controls, transaxle controls, battery controls, and regenerative braking controls.

The control module 38 communicates with the engine 12, battery 18, and electric machines 14, 22, to monitor and control their operation and performance. The control module 38 receives signals such as those indicative of engine speed, engine torque, vehicle speed, electric machine speed, electric machine torque, and operational state of the battery 18, from various sensors.

The control module 38 also receives input signals from other components or subsystems, such as signals indicative of vehicle power requested by a driver, which may be provided by an accelerator pedal sensor.

Acceleration and deceleration requests may be used to assess whether a "tip-in" event or a "tip-out" event has occurred. A tip-in event indicates that additional power or vehicle acceleration is demanded. A tip-out event indicates that less power or vehicle deceleration is demanded. For example, a tip-in event may be indicated by actuation of an accelerator pedal. Similarly, a tip-out event may be indicated by lifting off an accelerator pedal.

In a hybrid vehicle, acceleration (tip-in) and deceleration (tip-out) events leads to a change in the power provided to the wheelset 16. In general, an acceleration request increases power demand and deceleration request reduces power demand. This change in power demand may result in a transient condition or state in which the operational characteristics of at least one power source change to provide an increased or reduced amount of power.

In a hybrid vehicle having an engine 12, the engine power is a function of engine speed and engine output torque (e.g., power=torque*speed). During transient conditions, reduced fuel economy may occur if the engine speed and engine torque are not intelligently controlled. Fuel economy shortcomings may be magnified by aggressive driving with more frequent tip-in and/or tip-out events.

Stoichiometric operation of the engine occurs when the fuel provided is consumed by the air provided and no residual or excess fuel or air is leftover from the combustion process, or at an air-fuel ratio of one. If air content is less than is required for stoichiometric operation, a fuel-rich condition will occur where the unburned fuel or by-products thereof exit the engine 12 resulting in reduced combustion efficiency, potential emissions issues, and the like. The air-fuel ratio at fuel-rich conditions is less than one. If air content is higher than is required for stoichiometric operation, a fuel-lean condition will occur where excess air or by-products thereof exit the engine 12. The air-fuel ratio for fuel-lean conditions is greater than one.

The air-fuel ratio, or lambda ($\lambda$), is the ratio of the actual air-to-fuel ratio to the stoichiometric air-to-fuel ratio. A lambda of one represents stoichiometric operation. Lambda is defined further below in equation (3). Lambda is the inverse of the equivalence ratio of the mixture.

Some factors influencing the fuel economy for the drivetrain 10 and larger air-fuel errors on the rich side of operation leading to reduced fuel economy include the engine catalyst chemistry and scheduled fuel enrichments. Engine catalyst chemistry uses a constant switching between lean and rich operation with a k % (e.g. typically k is set to 2~3 in a split hybrid vehicle), toggling each way of stoichiometric operation. This may also be expressed as an inferred lambda of greater than 1−k %, (e.g., 0.97 if k=3). Scheduled fuel enrichments include events such as engine start, or the like, when it may be desirable to operate the engine under fuel rich conditions for a short period of time.

Test data from various hybrid vehicle systems was examined for the measured air-fuel ratio (measured lambda) within a series of engine cycles. The measured lambda is often determined using a sensor in the exhaust stream, such as an oxygen sensor or the like. The fast change rate of the engine command (i.e. tip in) was found to be a reason for larger air-fuel disturbances or errors on the fuel-rich operation side. The engine torque command was then compared to the measured air-fuel ratio and the larger air-fuel disturbances or errors generally aligned with larger change rates of engine torque command.

By moderating the fast change rate of the engine command (or fast transient of the engine command), fuel combustion transients are reduced and fuel economy may be improved for the hybrid vehicle.

Figure 2:
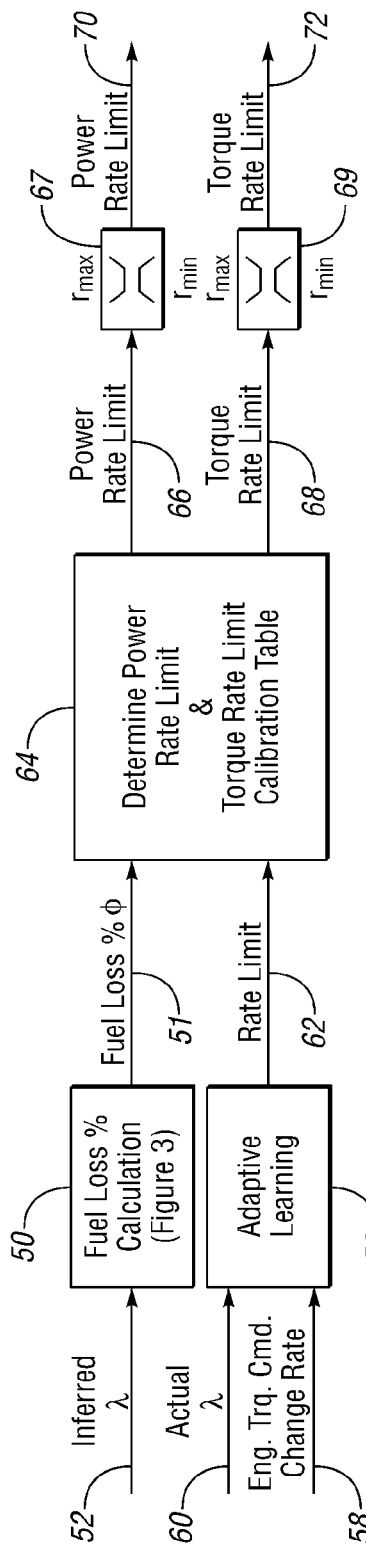
FIG. 2 is a flow chart for a calculation of rate limits according to another embodiment.

FIG. 2 depicts a schematic of a method for reducing the fast transients caused by engine command, according to an embodiment.

An inferred air-fuel ratio (inferred lambda) 52 is calculated by the engine subsystem controller and is used to calculate a predicted fuel loss percentage 51 at step 50. The engine subsystem controller often uses air mass sensors, air fuel sensors, and predication algorithms to determine the inferred lambda. Based on the predicted fuel loss percentage, the controller 38 adaptively changes and smoothes the engine commands to account for and potentially circumvent the requested fast transient to prevent fuel enrichment in a timely manner without interfering with the engine subsystem controls.

An "Adaptive Learning" step 56 occurs as well, which correlates the engine torque command change rate 58 and the measured air-fuel ratio (measured lambda) 60 collected during vehicle operation to provide a rate limit 62 as a guideline.

The fuel loss percentage 51 and the rate limit 62 are used in conjunction with a calibration table 64 to determine an engine power rate limit 66 and an engine torque rate limit 68. These rates 66, 68 may be clipped to calibrated values at 67 and 69 to provide a engine power rate limit command 70 and a engine torque rate limit command 72, respectively, for use by the engine controller.

A compensation mechanism is also incorporated into the system as described below to allow the engine to respond to a fast transient in some situations, including the case of insufficient electrical power from the battery. This allows the fast transients to be alleviated in the engine when possible while allowing the electric machine to provide the power to meet a fast transient demand when the power is available.

Figure 3:
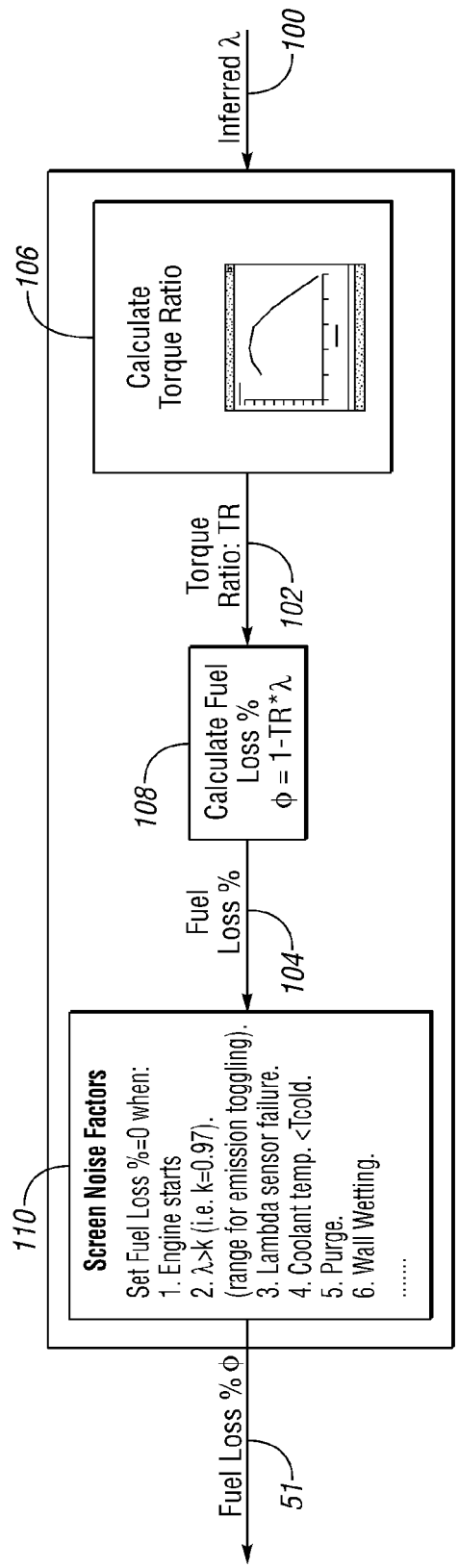
FIG. 3 is a flow chart for a calculation of a fuel loss percentage according to an embodiment.

FIG. 3 illustrates steps that are used to find a fuel loss percentage according to an embodiment using an inferred lambda at 100 with respect to stoichiometric operation of an engine.

The fuel loss percentage at 104 is calculated below using equation 1:

$$\text{Fuel Loss \%} = 1 - TR * \lambda \quad (1)$$

where $\lambda$ is the inferred air-fuel ratio at 100, and TR at 102 is the torque ratio when the engine is operating at $\lambda$. For example, when the engine is operating at stoichiometric conditions, where $\lambda=1$, the fuel loss percentage is equal to zero.

The engine torque ratio, TR, 102 is defined by:

$$TR = \frac{Trq(\lambda)}{Trq(\lambda_{stoich})} \quad (2)$$

where Trq is the torque as a function of the inferred air-fuel ratio (inferred lambda). Therefore the torque ratio is the torque taken at the inferred lambda over the torque at stoichiometric conditions where lambda is one, for the same air mass. For example, test data from the engine provides the data to create a calibration table 106 with torque ratio as a function of various inferred lambdas.

At a given speed-load condition for the engine and a given air mass, AM, lambda is defined by the following relationship:

$$\lambda = \frac{AFR}{AFR_{stoich}} = \frac{\frac{AM}{Fuel}}{\left(\frac{AM}{Fuel}\right)_{stoich}} = \frac{Fuel_{stoich}}{Fuel} \quad (3)$$

where AFR is the air-fuel ratio, AM is the amount of the air mass, and Fuel is the amount of fuel. Equation 3 may be simplified as follows:

$$Fuel_{stoich} = Fuel * \lambda \quad (4)$$

The fuel loss percentage at a given $\lambda$ compared to that at stoichiometric conditions is the difference of the amount of fuel needed and the amount of fuel for the same torque at stoichiometric conditions, normalized by the amount of fuel needed. This is shown as:

$$\text{Fuel Loss\%} = \frac{\text{Fuel} - \text{Fuel Needed for the same Torque at 'Stoic'}}{\text{Fuel}} \quad (5)$$

One can use the ratio $$\frac{Fuel_{stoic}}{Trq_{stoic}}$$

found through equations 2 and 4 above to calculate the fuel used per unit torque at stoichiometric conditions as:

$$\text{Fuel Loss\%} = \frac{\text{Fuel} - \frac{Fuel_{stoic}}{Trq_{stoic}} Trq}{\text{Fuel}} \quad (6)$$

By combining equations 4 and 2 and substituting them into equation 6, the relationship 108 for fuel loss percentage 104 is provided below, as is also shown in equation 1:

$$\text{Fuel Loss\%} = \frac{\text{Fuel} - \text{Fuel} * TR * \lambda}{\text{Fuel}} = 1 - TR * \lambda \quad (7)$$

If the engine operates in fuel-rich conditions, the use of additional fuel does not produce proportionally more torque. If the fast engine transient is avoided and the engine continues to operate at stoichiometric conditions instead of pulsing to fuel-rich to meet a fast transient, considerable fuel may be saved. This is also the case for the fuel-lean conditions; however, emissions treatments may be costly.

Additional screening 110 may occur after the calculation of the fuel loss percentage 104. This allows for a fast transient to occur under certain predetermined situations where it is beneficial or necessary. The conditions include engine start sequences, emissions toggling, measured lambda sensor failure, low engine coolant temperature, a purge cycle, a wall wetting cycle, inferred lambda greater than one, and the like.

Figure 4:
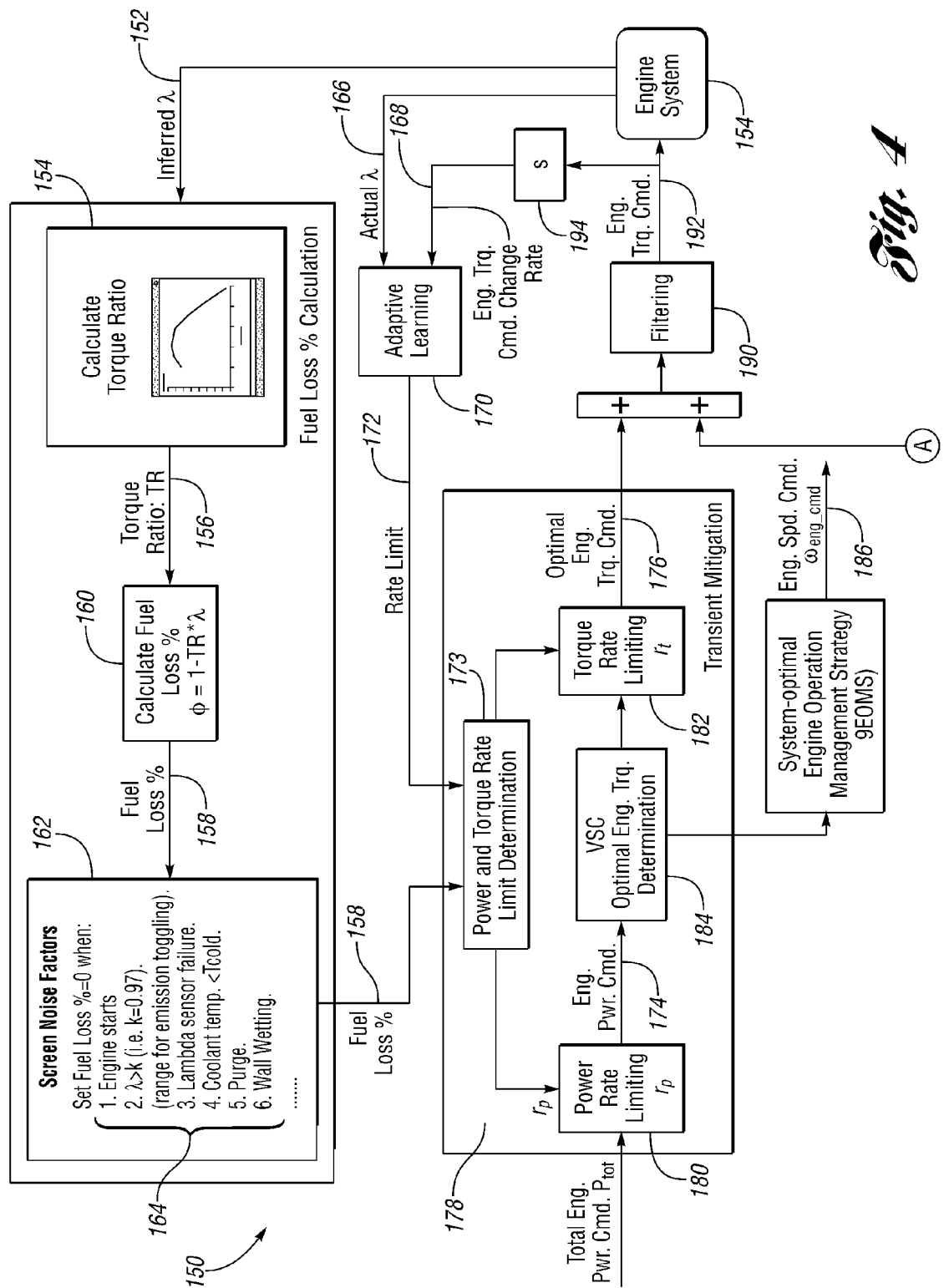
FIG. 4 is a flow chart for a control strategy for a hybrid vehicle powertrain according to another embodiment.
Figure 4:
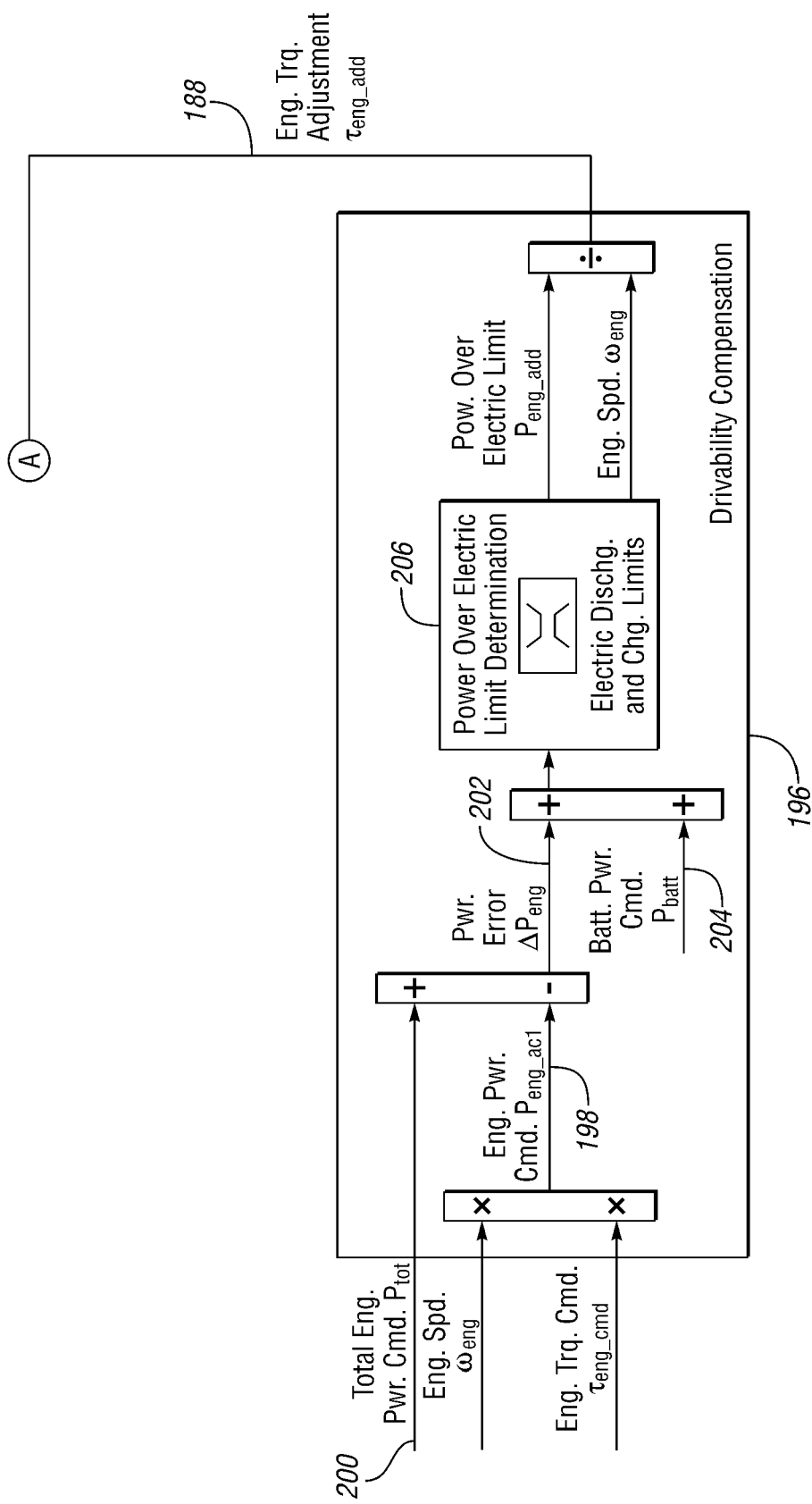

FIG. 4 illustrates a flow diagram 150 for engine transient mitigation according to an embodiment. The inferred lambda 152 is used as a predicative indicator of engine transients and is used to smooth the engine power commands and engine torque commands to improve fuel economy and increase the time the engine operates at fuel-lean or stoichiometric conditions.

The engine system 154 provides an inferred lambda 152 typically from air mass and fuel mass sensors, calibration tables, and predication algorithms. The inferred lambda 152 is used with a calibration table 154 to determine a torque ratio (TR) 156. The torque ratio 156 and inferred lambda 152 are used with equation (7) above to determine the fuel loss percentage 158 in process step 160. The fuel loss percentage 158 then undergoes a screening process 162. If a noise factor 164 is occurring, the fuel loss percentage 158 is set to zero. If a noise factor 164 is not occurring, the fuel loss percentage 158 is not changed. Noise factors at 164 include engine start sequences, emissions toggling, measured lambda sensor failure, low engine coolant temperature, a purge cycle, a wall wetting cycle, an inferred lambda greater than one, and the like. For emissions toggling, one criterion that may be used is when the inferred lambda is greater than 1−k %, e.g. when the inferred lambda is greater than 0.97, which relates to a k of 3%. The value for k may be 2%, 2.5%, or other values as is necessary for emissions toggling.

The engine system 154 also provides a measured lambda 166, which is typically determined using a sensor in the exhaust, such as an oxygen sensor. The measured lambda 166 and the current engine torque command change rate 168 undergo an adaptive learning process 170, which provides a rate limit 172. The rate limit 172 may be a feed-forward rate-limit term based on the adaptive learning, which provides a correlation between the measured lambda 166 and the engine torque command change rate 168.

The fuel loss percentage 158 and the rate limit 172 are used as inputs to calibration table 173 to determine the engine power rate limit and engine torque rate limit. An engine power command 174 and an optimal engine torque command 176 are determined in step 178. The power rate limit is subsequently applied using the rate limiting function 180 and the torque rate limit is applied using another rate limiting function 182.

The engine power command, which has been limited within a rate by 180, is sent to the vehicle system controller 184, which in turn provides an engine speed command 186 to the engine.

The optimal engine torque command 176 may be changed using an engine torque adjustment 188 in a filtering process 190 to provide an engine torque command 192 to the engine system 154. The engine torque command also undergoes a rate process 194, which provides the engine torque command change rate 168.

The engine torque adjustment 188 is based on the available power or charge in a battery 196 that is available to an electric motor to supplement the engine power for the vehicle in process 196. If the transient request is for a specified amount of torque, and the engine is not meeting that torque demand due to a transient mitigation as described here, the electric machine needs to supplement the engine torque to provide the specified torque requested. If the battery power is low and the electric machine will not be able to meet the torque request, the engine may be allowed to operate "fuel rich" during a fast transient to meet the request when it would otherwise be limited to near stoichiometric operation. For example, if a driver command exceeds the sum of engine power command and the maximum electrical power, the engine torque will be adjusted accordingly to meet the driver demand.

The total engine power command 198 is combined with an actual engine power command 200 to determine a power error 202. The power error 202 is combined with the battery power command 204 and examined in process 206, which determines if the power is over the electric limits, based on the charge and discharge limits of the battery. If the power is over the electrical limits of the battery, the amount of power over the electrical limit 208 is combined with the engine speed 210 to provide the engine torque adjustment 188.

The transient mitigation is typically provided only for fuel rich transients, which smoothes out the engine torque command 192 during a "tip-in" event to avoid a large air-fuel error on the rich side. The large air-fuel errors may cause reduced fuel economy. Transient mitigation is possible for fuel lean conditions as well, but is not commonly used due to emissions treatment issues in the exhaust.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A powertrain system for a hybrid vehicle comprising:
   an engine;
   an electric machine;
   a battery; and
   a controller configured to reduce fuel rich operation of the engine by determining an engine power rate limit and an engine torque rate limit using a fuel loss percentage and a rate limit; wherein the controller is configured to adjust the engine torque rate limit in response to a driver demand exceeding a sum of an engine power command and a maximum available electrical power from the battery.

2. The powertrain system of claim 1 further comprising an air mass sensor, wherein the controller is configured to calculate an inferred air fuel ratio using an output from the air mass sensor;
   wherein the controller is configured to calculate the fuel loss percentage as a function of an inferred air fuel ratio and a torque ratio.

3. The powertrain system of claim 2 wherein the controller is configured to set the fuel loss percentage to be zero when the inferred air fuel ratio is greater than approximately 1−k %.

4. The powertrain system of claim 2 wherein the controller is configured to calculate the fuel loss percentage using:

phi=1−$TR$*(inferred air fuel ratio), where phi is the fuel loss percentage, the inferred air fuel ratio is a ratio of a present air-fuel ratio to a stoichiometric air fuel ratio, and TR is a torque ratio of torque at the inferred air fuel ratio to torque at stoichiometric conditions.

5. The powertrain system of claim 1 further comprising a sensor for measuring an air fuel ratio;
   wherein the controller is configured to determine the rate limit using an engine torque command and the measured air fuel ratio.

6. The powertrain system of claim 1 further comprising a drivetrain of the vehicle having a planetary gearset.

7. The powertrain system of claim 1 wherein the controller comprises a calibration table; and
   wherein the controller is configured to use the fuel loss percentage and the rate limit as inputs to the calibration table to determine the engine power rate limit and the engine torque rate limit.

8. The powertrain system of claim 1 wherein fuel rich operation of the engine occurs during a fast transient of the engine.

9. The powertrain system of claim 1 wherein the controller is configured to set the fuel loss percentage to zero; and
   wherein the controller is configured to override the rate limited power command and the rate limited torque command to permit fuel-rich operation of the engine.

10. The powertrain system of claim 9 wherein the controller is configured to set the fuel loss percentage to zero at stoichiometric conditions.

11. The powertrain system of claim 9 wherein the controller is configured to screen a noise factor such that during the noise factor the fuel loss percentage is set to zero.

* * * * *